W. R. JOHNSTON.
WINDSHIELD WING FOR AUTOMOBILES.
APPLICATION FILED FEB. 28, 1921.
1,429,433.
Patented Sept. 19, 1922.
2 SHEETS—SHEET 1.
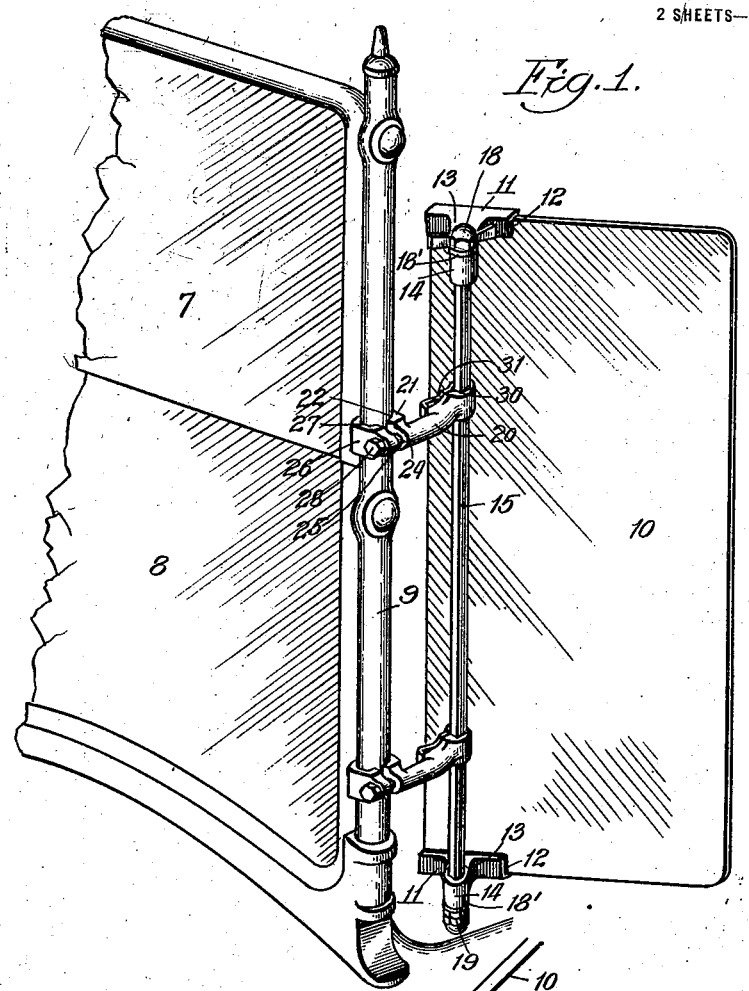
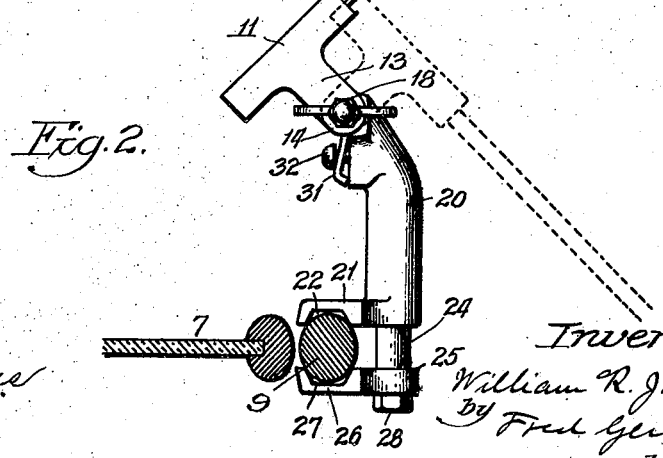

W. R. JOHNSTON.
WINDSHIELD WING FOR AUTOMOBILES.
APPLICATION FILED FEB. 28, 1921.
1,429,433.
Patented Sept. 19, 1922.
2 SHEETS—SHEET 2.
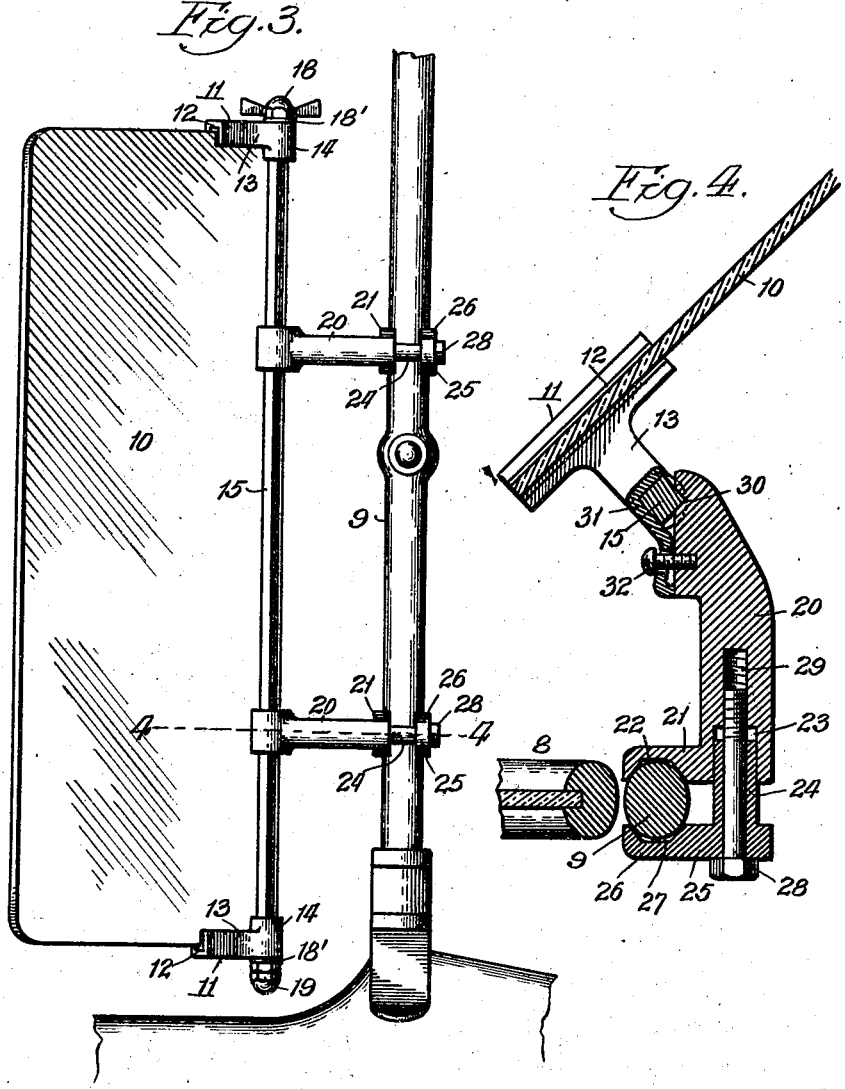
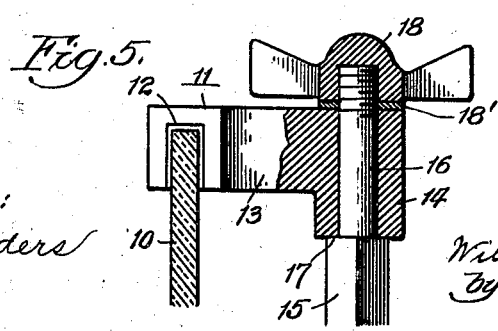
Witness:
John Enders
Inventor.
William R. Johnston
By Fred Gerlach
his Atty Patented Sept. 19, 1922.

1,429,433

UNITED STATES PATENT OFFICE.

WILLIAM R. JOHNSTON, OF CHICAGO, ILLINOIS, ASSIGNOR TO WM. R. JOHNSTON MFG. CO., OF CHICAGO, ILLINOIS, A CORPORATION OF ILLINOIS.

WINDSHIELD WING FOR AUTOMOBILES.

Application filed February 28, 1921. Serial No. 448,726.

*To all whom it may concern:*

Be it known that I, WILLIAM R. JOHNSTON, a citizen of the United States, and a resident of Chicago, in the county of Cook and State of Illinois, have invented certain new and useful Improvements in Windshield Wings for Automobiles, of which the following is a full, clear, and exact description.

The invention relates to wind-shield wings for automobiles and its object is to provide an improved bracket for connecting the standard to which the wind-shield wing is adjustably secured and a fixed post or support on the automobile.

The invention consists in the several novel features hereinafter set forth and more particularly defined by claims at the conclusion hereof.

In the drawings: Fig. 1 is a perspective of a wind-shield wing embodying the invention. Fig. 2 is a plan. Fig. 3 is a side elevation. Fig. 4 is a section taken on line 4—4 of Fig. 3. Fig. 5 is a detail of one of the adjustable pivotal connections between the standard and one of the brackets in which the glass plate is held.

The invention is illustrated as applied to an automobile equipped with a wind-shield comprising sections 7 and 8 which are pivotally mounted in a wind-shield frame comprising side posts 9, as well understood in the art.

The wing comprises a frameless glass plate 10, the upper and lower margins of which are held by, and clamped between, brackets 11 which are provided with grooves 12, arms 13 and sockets 14. A standard 15, usually polygonal, is provided with reduced ends 16 which pass through the sockets 14 and with shoulders 17 adapted to be engaged by the sockets. Nuts 18 and 19 which are threaded to the ends of the standard terminals 16, are adapted when tight to secure the brackets against pivotal movement around the standard. A spring washer 18' is interposed between each nut and the bracket held thereby. When nut 18 is loosened, the wing may be adjusted.

One object of the present invention is to provide an improved supporting bracket for the standard 15, two of which, alike in construction, are usually used to support each standard. Each of these brackets comprises an arm 20, at one end of which is formed a laterally projecting lug 21 which is formed with a wedge-seat 22 to engage the front portion of the fixed post 9. Arm 20 is also provided with a socket 23 in which is slidably held a sleeve 24 integrally formed with a coacting clamping member 25 which is provided with a laterally extending lug 26 provided with a wedge-seat 27 to engage the rear portion of post 9. These lugs and seats form gripping jaws for said post. A bolt 28 passes through clamp-member 25 and its sleeve 24 and into a threaded socket 29 in the arm 20. The socket and sleeve connections 23 and 24 constitute a sliding connection between the clamping members which causes them to move toward and from each other in a rectilinear path so that the seats in the jaws on said members will effectively impinge against the fixed post 9 with uniform pressure at all points intended. When pivotal movement is provided for or permitted between the clamping members, it frequently occurs that no contact occurs at some of the active points of the gripping jaws so that the brackets will not be effectively held.

The other end of the arm 20 is provided with laterally projecting portion having a V-shaped seat 30 to receive the polygonal standard 15 and a clip 31, which is adjustably secured to the arm by the screw 32, serves to secure the standard 15 to the bracket.

The arms shown are disposed outwardly of the wind-shield post 9 and outwardly of the axis of pivotal movement of the wing and extend rearwardly from the post 9 so that it becomes possible to open the wind-shield sections a considerable extent when the wing is positioned to deflect air outwardly, as shown by full lines in Fig. 2, and to an unlimited extent when the wing is positioned as shown by dotted lines in said Fig. 2, because there is clearance between the supporting device and said sections for this purpose. Heretofore, these supporting devices were of such a character that they would interfere with the opening or inward swinging of the wind-shield section.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A wind shield wing for automobiles, comprising a plate and means for supporting the plate comprising an arm, a gripping jaw on said arm, a clamping member provided with a coacting jaw to grip a post, a sleeve and socket connection between said arm and said member, and a screw extending through the connection for securing said members together.

2. A wind-shield wing for automobiles comprising a plate, a standard by which the plate is supported, an arm, means for securing the standard to one end of the arm, a gripping jaw on said arm, a clamping member provided with a coacting gripping jaw for securing the arm to a fixed post on a vehicle, a sleeve-and-socket connection between said arm and said member, and a screw extending through the sleeve for securing said members together.

3. A wind-shield wing for automobiles comprising a plate, a standard by which the plate is supported, an arm, means for securing the standard to one end of the arm, a gripping jaw projecting laterally from one side of said arm and a clamping member provided with a coacting laterally extending gripping jaw, a sleeve-and-socket-connection between said arm and said member and a screw extending through said connection for securing said members together.

WILLIAM R. JOHNSTON.